United States Patent [19]

Cole et al.

[11] Patent Number: 5,179,675

[45] Date of Patent: Jan. 12, 1993

[54] DATA PROCESSING SYSTEM WITH CACHE MEMORY ADDRESSABLE BY VIRTUAL AND PHYSICAL ADDRESS

[75] Inventors: Terence M. Cole, Berkshire; Geoffrey Poskitt, Surrey, both of Great Britain

[73] Assignee: International Computers Limited, London, England

[21] Appl. No.: 399,969

[22] Filed: Aug. 29, 1989

[30] Foreign Application Priority Data

Sep. 30, 1988 [GB] United Kingdom ............... 8823077

[51] Int. Cl.⁵ .................. G06F 12/10; G06F 12/14
[52] U.S. Cl. ................... 395/400; 395/425; 364/DIG. 1
[58] Field of Search ... 364/200 MS File, 900 MS File; 365/49; 395/425, 400

[56] References Cited

U.S. PATENT DOCUMENTS

| | | | |
|---|---|---|---|
| 4,386,402 | 5/1983 | Toy | 395/400 |
| 4,580,240 | 4/1986 | Watanabe | 395/425 |
| 4,587,610 | 5/1986 | Rodman | 395/400 |
| 4,622,631 | 11/1986 | Frank et al. | 395/800 |
| 4,714,990 | 12/1987 | Desyllas et al. | 395/425 |
| 4,761,733 | 8/1988 | McCrocklin et al. | 395/400 X |
| 4,785,398 | 11/1988 | Joyce et al. | 395/425 |
| 4,991,081 | 2/1991 | Bosshart | 395/425 |
| 5,008,813 | 4/1991 | Crane et al. | 395/425 |
| 5,029,070 | 7/1991 | McCarthy et al. | 395/425 |

FOREIGN PATENT DOCUMENTS 0232526 8/1987 European Pat. Off.
261749 10/1989 Japan.
2-34245 9/1990 Japan.

OTHER PUBLICATIONS

Smith, "Cache Memories", Computing Surveys, vol. 14, No. 3, Sep. 1982, pp. 473-529.
Van Loo, "Maximize performance by choosing best memory", Computer Design, Aug., 1987, pp. 89-94.
Goodman, "Coherency for Multiprocessor Virtual Address Caches", Proceedings 2nd Int. Conf. Architectural Support for Programming Languages and Operating Systems, Oct. 5-8, 1987, pp. 72-81.

Primary Examiner—Glenn Gossage
Assistant Examiner—Michael A. Whitfield
Attorney, Agent, or Firm—Lee, Mann, Smith, McWilliams, Sweeney & Ohlson

[57] ABSTRACT

A data processing unit accesses data in a cache using a virtual address. If the data is not in the cache, the virtual address is translated by a memory management unit (MMU) into a physical address for accessing a main memory. The MMU can also access the cache, using the physical address, to retrieve page table entries held in the cache. This avoids the need for a main memory access to retrieve the page table entries, and hence speeds up the address translation operation. The physically addressed entries in the cache are tagged with a reserved context number to distinguish them from the virtually addressed data.

5 Claims, 4 Drawing Sheets

DATA PROCESSING SYSTEM WITH CACHE MEMORY ADDRESSABLE BY VIRTUAL AND PHYSICAL ADDRESS

BACKGROUND TO THE INVENTION

This invention relates to data processing apparatus and, more specifically, is concerned with a data processing apparatus including a cache memory.

It is well known to provide a two-level memory system, consisting of a main memory and a smaller, faster cache memory. In operation, the cache is arranged to hold copies of data items from the main memory that are currently in use, or are likely to be required in the near future, so that these items can be accessed rapidly, without the delay of a main memory access. Such memories are described, for example, "Cache Memories" by A. J. Smith, ACM (Association for Computing Machinery) Computing Surveys, Vol. 14, No. 3, September 1982, pages 473-529.

As described on page 479 of the above Computing Surveys article, in a computer system with virtual memory, the cache may potentially be accessed either with a real (or physical) address, or a virtual address. The advantage of using the virtual address is that it is not necessary to wait for the address to be translated before accessing the cache, and hence the cache access is faster. The address has to be translated only if the required data item is not present in the cache.

The translation of the virtual address may conventionally be performed by a memory management unit (MMU) comprising an associatively addressed memory holding address translation information (e.g. page table entries) for recently used virtual addresses. If the required address translation information is not present in the MMU, then the main memory is accessed, to read the required page table entry. Possibly several main memory accesses are required to translate an address.

A problem with this is that, since main memory access is relatively slow, the address translation process can take a relatively long time. The object of the present invention is to overcome this problem.

SUMMARY OF THE INVENTION

According to the invention there is provided a data processing apparatus comprising
  (a) a data processing unit,
  (b) a cache memory, addressable by means of a virtual address from the processing unit, so as to access data items from the cache memory,
  (c) a memory management unit, for translating virtual addresses from the processing unit into physical addresses, and
  (d) a main memory, addressable by the physical address from the memory management unit,
characterised in that the physical addresses from the memory management unit can also be used to address the cache memory to allow the memory management unit to access address translation information from the cache memory.

BRIEF DESCRIPTION OF THE DRAWINGS

A data processing system embodying a data memory system in accordance with the invention will now be described by way of example with reference to the accompanying drawings.

DESCRIPTION OF AN EMBODIMENT OF THE INVENTION

Figure 1:
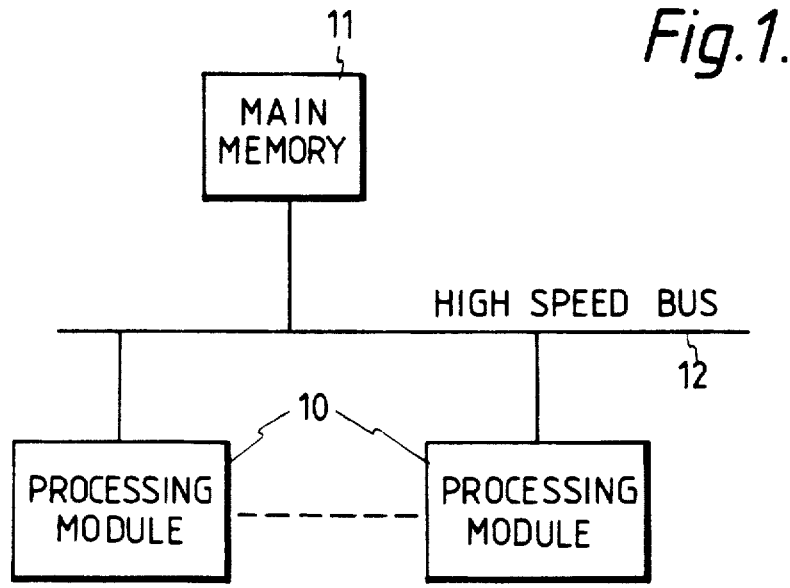
FIG. 1 is an overall block diagram of the data processing system.

Referring to FIG. 1, the data processing system comprises a plurality of data processing modules 10, and a main memory 11, interconnected by a high-speed bus 12.

In operation, any one of the processing modules 10 can acquire ownership of the bus for the purpose of initiating a bus transaction e.g. a read or write over the bus 12 to the memory module 11. Ownership of the bus is acquired by a bus arbitration scheme, details of which are not relevant to the present invention.

Figure 2:
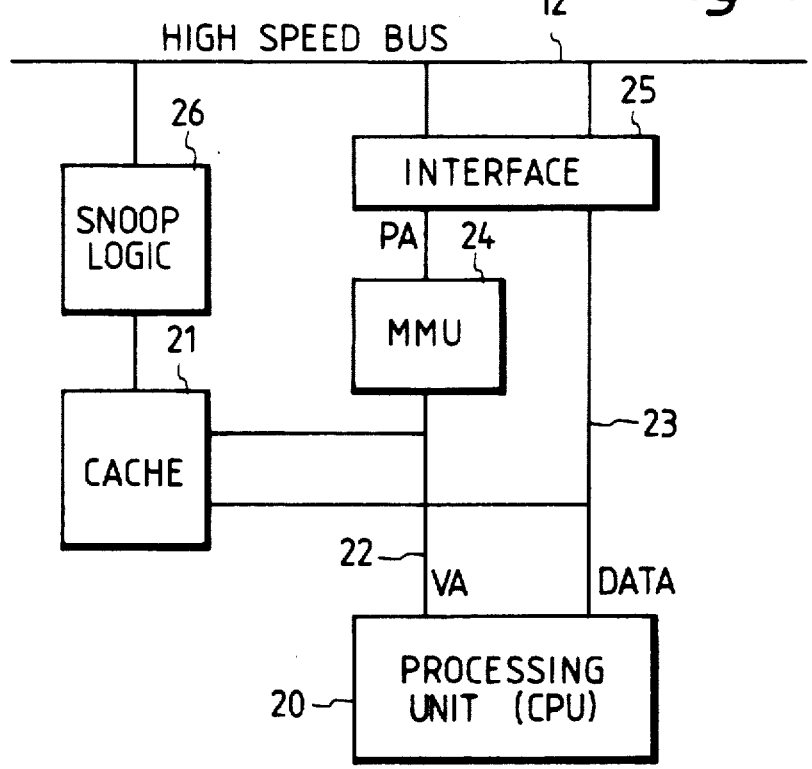
FIG. 2 is a block diagram of one of the processing modules of the system.

Referring now to FIG. 2, this shows one of the processing modules 10 in more detail.

The processing module comprises a central processing unit (CPU) 20.

The processing module also includes a cache memory 21. This is a relative small, fast-access memory, compared with the main memory 11, and holds local copies of data items, for rapid access by the processing unit. In operation, when the processing unit requires to access a data item, for reading or writing, it generates the virtual address VA of the item, on an address path 22. The virtual address VA is applied to the cache 21. If the required data item is present in the cache, a HIT is indicated, allowing the processing unit to read or write the data item, by way of the data path 23.

If, on the other hand, the required data item is not present in the cache, it must be accessed from the main memory and loaded into the cache. The main memory is addressed by means of a physical address PA, which is derived from the virtual address VA by means of a memory management unit (MMU) 24. The physical address is sent over the bus 12 by way of an interface unit 25.

The construction and operation of the MMU 24 may be conventional and so need not be described in detail. Briefly, the MMU 24 uses a small associatively addressed memory (not shown) to hold copies of recently used page table entries. If the required page table entry is present, it can be accessed immediately, and used to form the required physical address of the data. If, on the other hand, the page table entry is not present, the MMU generates the physical addresses for searching a hierarchically organised page table structure to access the required entry. The retreived page table entry is then loaded into the associative memory on the MMU, so that it is available for future translations. The MMU may have to perform several page table accesses to obtain the required page table entry.

In a conventional system, the physical address of each page table entry is used to access the page tables in the main memory of the system. However, in the present case, the physical address PA of the page table entry is stored in a buffer 27 (FIG. 3), and is then used to address the cache 21. If the required page table entry is held in the cache (because it has been accessed previously), then it can be retrieved rapidly from the cache and returned to the MMU. If, on the other hand, the page table entry is not in the cache, then the main memory 1 must be accessed to obtain the required table entry. The page table entry is then loaded into the cache 21.

Hence, it can be seen that the cache 21 can be addressed in two ways:

(i) by the virtual address from the CPU 20, to access data, and
(ii) by the physical address from the MMU 24, to access page table entries for address translation.

Allowing the MMU to access page table entries in the cache in this way greatly speeds up the operation of the MMU, and hence improves the efficiency of the system.

As will be shown, the physically addressed items in the cache are distinguished from the virtually addressed items by having a specially reserved context tag value.

The processing module also includes a snoop logic unit 26 whose purpose is to ensure coherency between the contents of the cache 21 and the caches in the other processing modules. The snoop logic 26 is an associative memory which stores as tags the physical addresses of all the data (or page table entries) currently resident in the cache 21. The snoop logic receives all the physical addresses appearing on the high speed bus from all the processing modules, and compares each received address with the stored physical address tags. If the received address matches any one of the stored physical addresses, the snoop logic generates the corresponding virtual address, and applies it to the cache 21 so as to access the corresponding line of data.

The operation of the snoop logic unit 26 will be described in more detail later.

Figure 3:
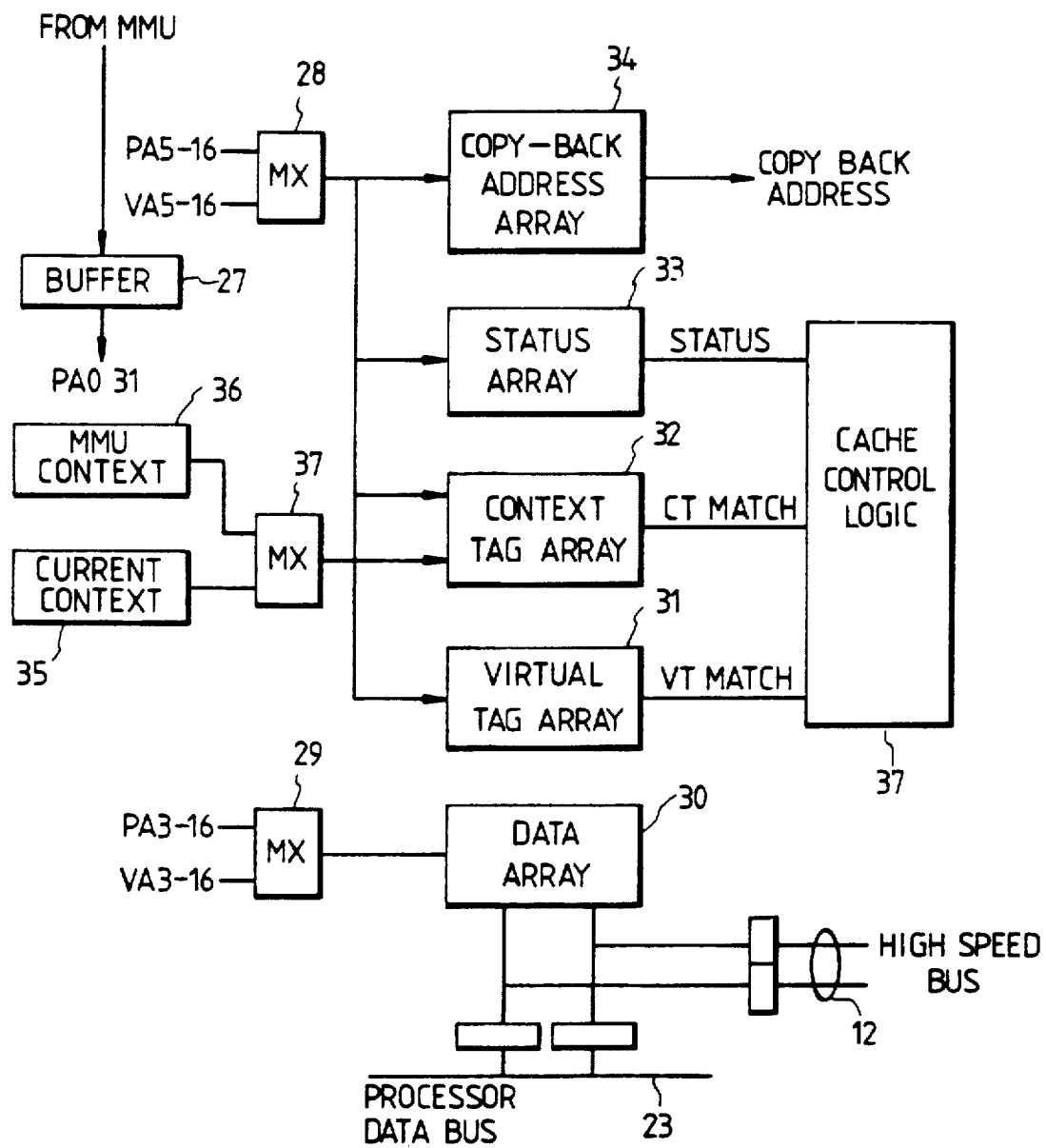
FIG. 3 is a block diagram of a cache memory forming part of each of the processing modules.

Referring now to FIG. 3, this shows the cache 21 in more detail.

In this figure, the virtual address VA is shown as consisting of the 32 bits VA 0-31, where VA0 is the least significant bit, and the physical address PA stored in the buffer 27 is shown as consisting of bits PA 0-31. Multiplexers 28, 29 select between VA and PA, according to whether the cache is currently being addressed by the CPU or the MMU.

The cache 21 comprises a data array 30, which is a random-access memory (RAM) holding 16K double words, each double word consisting of 64 bits (8 bytes). The data array 30 is addressed by bits VA 3-16 (or PA3-16), so as to access one double word. This double word can then be written or read, by way of the high speed bus 12, or the processor data path 23.

The data array is regarded as being organised into 4K lines of data, each line containing four double words (32 bytes). Bits VA 5-16 (or PA 5-16) select one line of the cache, while bits VA 3-4 (or PA 3-4) select one double word within this line.

The cache also comprises an address tag array 31, a context tag array 32, a status array 33, and a copy-back address array 34. Each of these arrays comprises a RAM, having 4K locations, one for each line of data in the cache. These arrays are all addressed in parallel by bits VA 5-16 (or PA 5-16), so that whenever a line of the data array is accessed, the corresponding location in each of the arrays 31-34 is also accessed.

The address tag array 31 holds a 15-bit address tag for each line in the cache. Whenever a new line is loaded into the data array, bits VA 17-31 (or PA 17-31) of its address are written into the array 31 as the address tag for that line. Correspondingly, whenever a line is accessed in the data array, its address tag is compared with address bits VA 17-31 or PA17-31. If they are equal, a VT MATCH signal is produced.

The cache also comprises two registers, referred to as the current context register 35 and the MMU context register 36.

The current context register 35 is accessible by the processing unit 20. Whenever the processing unit 20 initiates a new program, it allocates a 16-bit context number to that program. This context number can have any of a range of values, excluding a predetermined value, which is reserved for the MMU. Whenever the processing unit starts to execute a program to which a context number has been allocated, it loads that context number into the current context register 35.

The MMU context register 36 holds a preset value, equal to the reserved context number of the MMU. A multiplexer 37 selects between the outputs of the two registers 35 and 36.

The context tag array 32 holds a 16-bit context tag for each line of the cache. The data input of this array is connected to the output of the multiplexer 37. Whenever a new line of data or page table entry is loaded into the cache, the contents of the register 35 or 36 are written into the currently addressed location of the array, as the context tag for this line, so that each data item is tagged with the context number of the program to which it belongs, and each page table entry is tagged with the MMU reserved context number. Correspondingly, whenever a line of data or a page table entry is accessed, its context tag is compared with the contents of the register 35 or 36. If they are equal, a CT MATCH signal is produced.

Both the tag arrays 31 and 32 are constructed from JGS—THOMSON MK41H80 devices, which provide the necessary RAMs and also comparators for performing the above-mentioned comparisons.

The status array 33 holds three status bits for each line of the cache. These indicate the state of the corresponding line, as follows.

| Status bits | State |
| --- | --- |
| 000 | INVALID |
| 001 | PRIVATE |
| 011 | MODIFIED |
| 101 | SHARED. |

PRIVATE means that the data in the line is not shared with any of the other processing modules, and that it has not been modified (updated) since it was loaded into the cache.

MODIFIED means that the data in the line is not shared, and that it has been modified. It is therefore the most up-to-date copy in the system of this data.

SHARED means that a copy of this data is also held in at least one other processing module, and that it has not been modified.

The outputs of the arrays 31-33 are all fed to a cache control logic unit 38, which controls the operation of the cache as will be described.

The copy-back address array 34 holds a 19-bit physical address PA for each line in the cache. This indicates the physical address in main memory to which the line will eventually be copied back.

Figure 4:
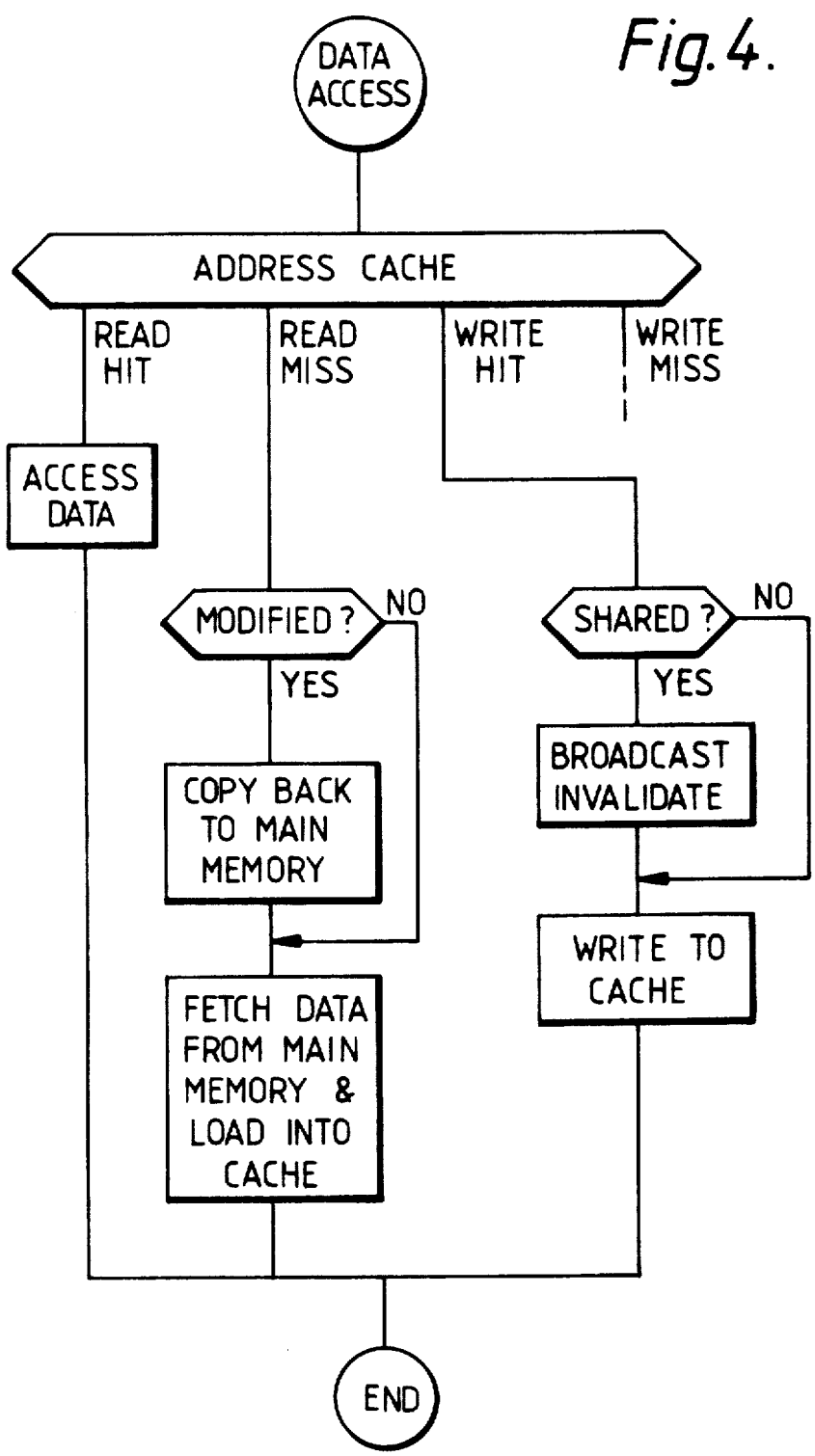
FIG. 4 is a flow chart illustrating the operation of the cache memory.

Referring now to FIG. 4, this illustrates the operation of the cache 21.

As mentioned above, whenever the processing unit 20 requires to access a data item, it applies the virtual address VA of the data to the cache 21, so as to access a line of the cache. If VT MATCH and CT MATCH are both true, and if the line is valid (i.e. the status bits are not equal to 000) then a HIT is scored, indicating that the required data item is present in the addressed line of the cache. Otherwise, a MISS is scored.

The operation of the cache depends on whether a HIT or a MISS is scored, and on whether this is a READ or WRITE operation, as follows.

(1) READ HIT. In this case, the data can be accessed immediately from the cache. The status of the cache line is not changed.

(2) READ MISS. In this case, the required data must be fetched from the main store, and loaded into the cache, overwriting the existing line of the cache. If the existing line is in the MODIFIED state, it must first be copied back to the main memory, so as to ensure that the most up-to-date copy of the data is preserved. This is achieved by means of a block write transaction over the high speed bus. The required data is then fetched from the main memory by means of a block read transaction over the high speed bus, and loaded into the cache. The status of the new block is set either to SHARED or PRIVATE, according to whether or not this line is already present in the cache of another processing module, as indicated by a "shared" status line of the bus.

(3) WRITE HIT. If the current status of the cache line is PRIVATE, the data is written into the cache, and the status is set to MODIFIED. If the status is already MODIFIED, the write proceeds without delay and there is no state change. If the cache line status is SHARED, then the physical address on the line is broadcast over the bus to the other processing modules, so that they can invalidate the corresponding line in their caches, to ensure cache coherency. This is referred to as a broadcast invalidate operation. The data is written into the cache and the cache line status set to MODIFIED.

(4) WRITE MISS. In this case, the cache follows the sequence for read miss described above, followed by the sequence for write hit.

The operation of the cache is similar when it is addressed by the physical address PA from the MMU in order to access a page table entry.

Figure 5:
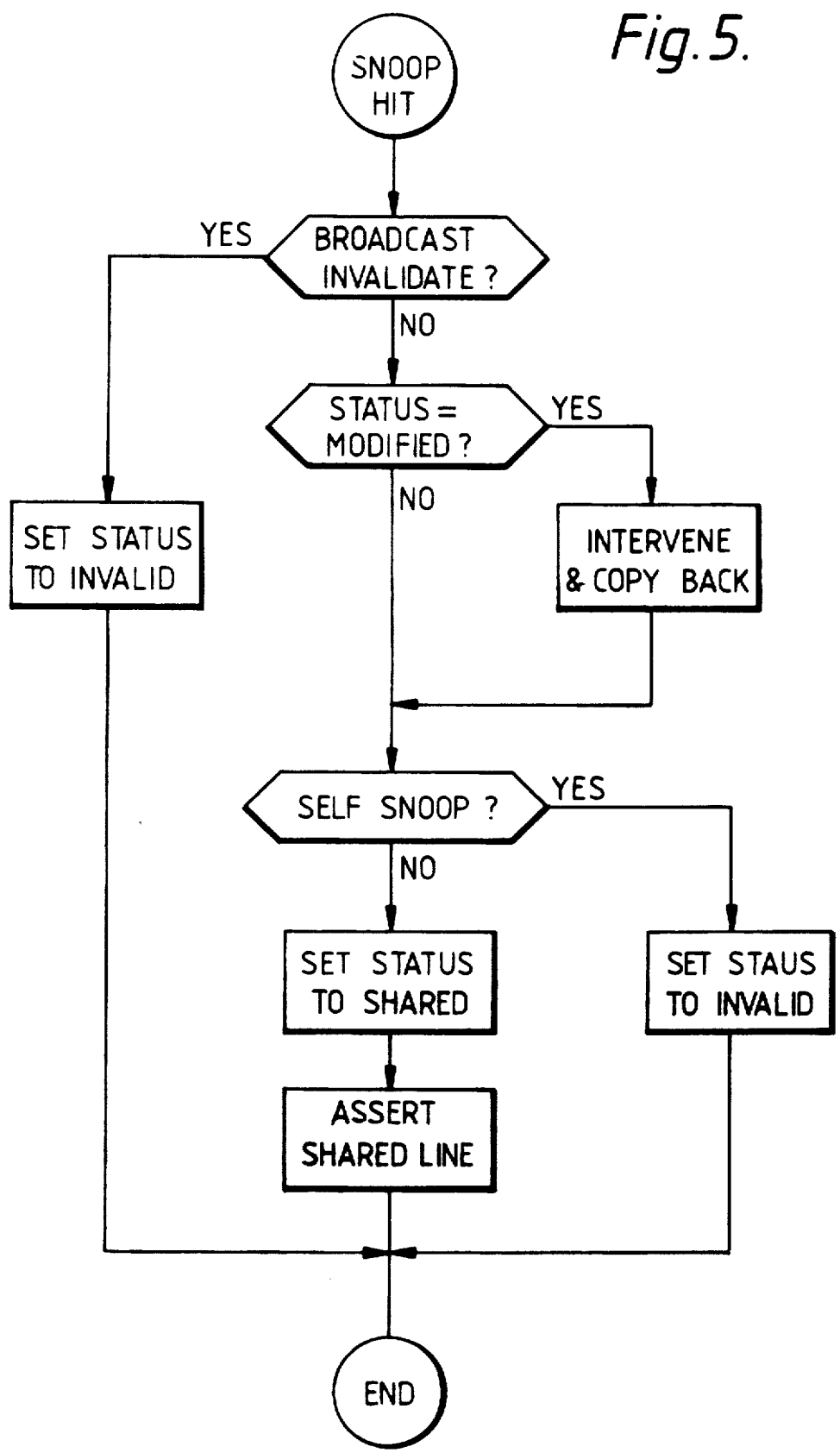
FIG. 5 is a flow chart illustrating the operation of a snoop logic unit forming part of each of the processing modules.

Referring now to FIG. 5, the operation of the snoop logic unit 23 is as follows. If the snoop logic detects a match during a broadcast invalidate operation by another processing module, it sets the status of the addressed cache line to INVALID. This ensures cache coherency.

If, on the other hand, the snoop logic detects a match during a block read transaction, instead of during a broadcast invalidate, it checks the states of the data line in the cache 21. If the status of the cache line is MODIFIED, the snoop logic initiates an INTERVENTION operation. This causes the block read transaction to be temporarily suspended, while the data line is copied back to the main memory. The block read transaction is then allowed to continue. This ensures that the most up-to-date copy of the data is available in the main memory for the block read transaction.

It should be noted that the snoop logic monitors block read transactions generated by all the processing modules, including the module in which the snoop logic is located. This latter possibility is referred to as a "self-snoop" operation, its purpose being to prevent the problem of synonyms in the cache. A synonym occurs where two or more virtual addresses map on to the same physical address, so that more than one copy of the same data item may be present in different locations of the cache.

If the cache hit resulted from a self-snoop operation, the status of the address line of the cache is set to INVALID. Thus, the existing copy of the data item in the cache is invalidated, preventing the occurrence of a synonym.

If, on the other hand, the cache hit resulted from a read transaction by another processing module, then the status of the addressed line of the cache is set to SHARED, and the shared status line of the bus is asserted, so as to inform the other module that the data in question is also present in the cache in this processing module.

The operation of the snoop logic is the same for cached page table entries as it is for data entries.

We claim:

1. A data processing apparatus, comprising
   (a) a data processing unit, for providing a virtual address,
   (b) a memory management unit, connected to receive said virtual address from the data processing unit, for translating said virtual address into a physical address,
   (c) a main memory connected to receive said physical address from the memory management unit, the main memory holding data items and address translation information,
   (d) a cache memory having a plurality of individually addressable locations, each location having a context tag,
   (e) means for defining a reserved context number having a fixed value,
   (f) means for maintaining a current context number having a variable value different from that of said reserved context number,
   (g) means operative in a first mode, for addressing a a first addressable location in the cache memory with said virtual address from the processing unit, writing a copy of a data item from the main memory into said first addressable location, and setting the context tag of said first addressable location in the cache memory to the current context number, and
   (h) means operative in a second mode, for addressing a further location in the cache memory with said physical address from the memory management unit, writing a copy of a portion of said address translation information from the main memory into said further location, and setting the context tag of said further location in the cache memory to the reserved context number.

2. A data processing method comprising:
   (a) storing data items and address translation table entries in a main memory,
   (b) operating a memory management unit to translate a virtual address from a data processing unit into a physical address for addressing the main memory,
   (c) transferring copies of a portion of the data items from the main memory into a cache memory, and addressing those copies in the cache memory by means of said virtual address from the data processing unit, and
   (d) transferring copies of a portion of the address translation table entries from the main memory into the cache memory, tagging said copies of the address translation table entries in the cache to indicate that they are physically addressed, and addressing those copies in the cache memory by means of said physical address from the memory management unit.

3. A data processing method according to claim 2, comprising the further steps:
(a) defining a reserved context number having a predetermined value,
(b) maintaining a current context number having a variable value different from said predetermined value,
(c) tagging each data item copied into the cache memory with the current context number, and
(d) tagging each address translation table entry copied into the cache memory with the reserved context number.

4. A data processing method according to claim 3, wherein,
(a) when a copy of a data item in the cache memory is addressed by means of said virtual address, a corresponding context tag of that data item is compared with the current context number, and if they are equal, a context tag match is indicated, and
(b) when a copy of an address translation table entry in the cache memory is addressed by means of said physical address, an associated context tag of that address translation table entry is compared with the reserved context number, and if they are equal, a context tag match is indicated.

5. A data processing apparatus comprising:
(a) a data processing unit, for providing a virtual address,
(b) a memory management unit, connected to receive said virtual address from the data processing unit, for translating said virtual address into a physical address,
(c) a main memory connected to receive said physical address from the memory management unit, the main memory holding data items and address translation information,
(d) a cache memory holding copies of a portion of said data items and address translation information, and
(e) selection means operable in a first mode to select said virtual address from the processing unit for addressing said copies of said data items in the cache memory and operable in a second mode to select said physical address from the memory management unit for addressing said copies of said address translation information in the cache memory, wherein the cache memory comprises:
(i) a plurality of individually addressable locations, each containing a context tag,
(ii) means for defining a reserved context number having a fixed value,
(iii) means for maintaining a current context number having a variable value different from that of said reserved context number 1,
(iv) means operable in the first mode, to compare the context tag of a currently addressed location of the cache memory with the current context number, and for indicating a context tag match if they are equal, and
(v) means operable in the second mode, to compare the context tag of the currently addressed location of the cache memory with the reserved context number, and for indicating a context tag match if they are equal.

* * * * *